…

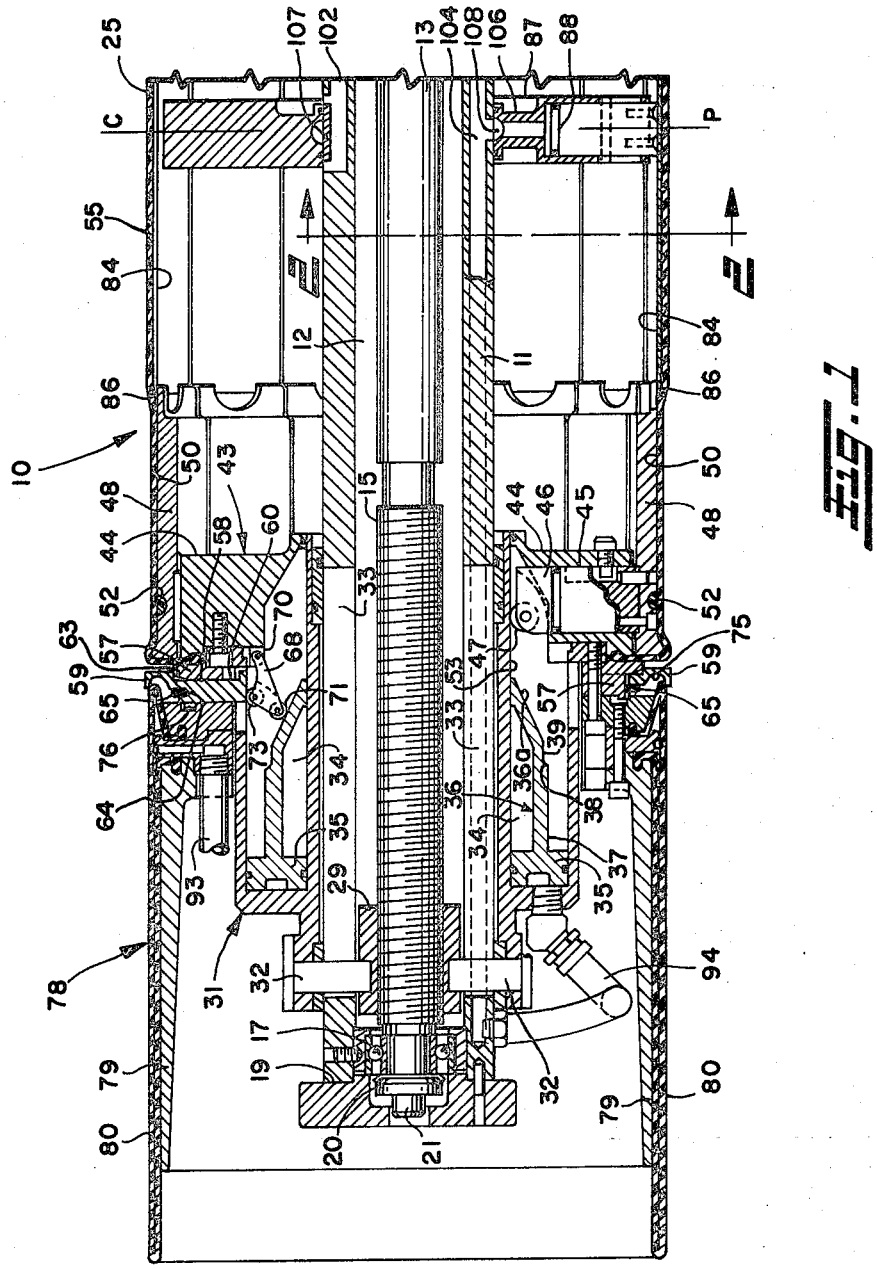

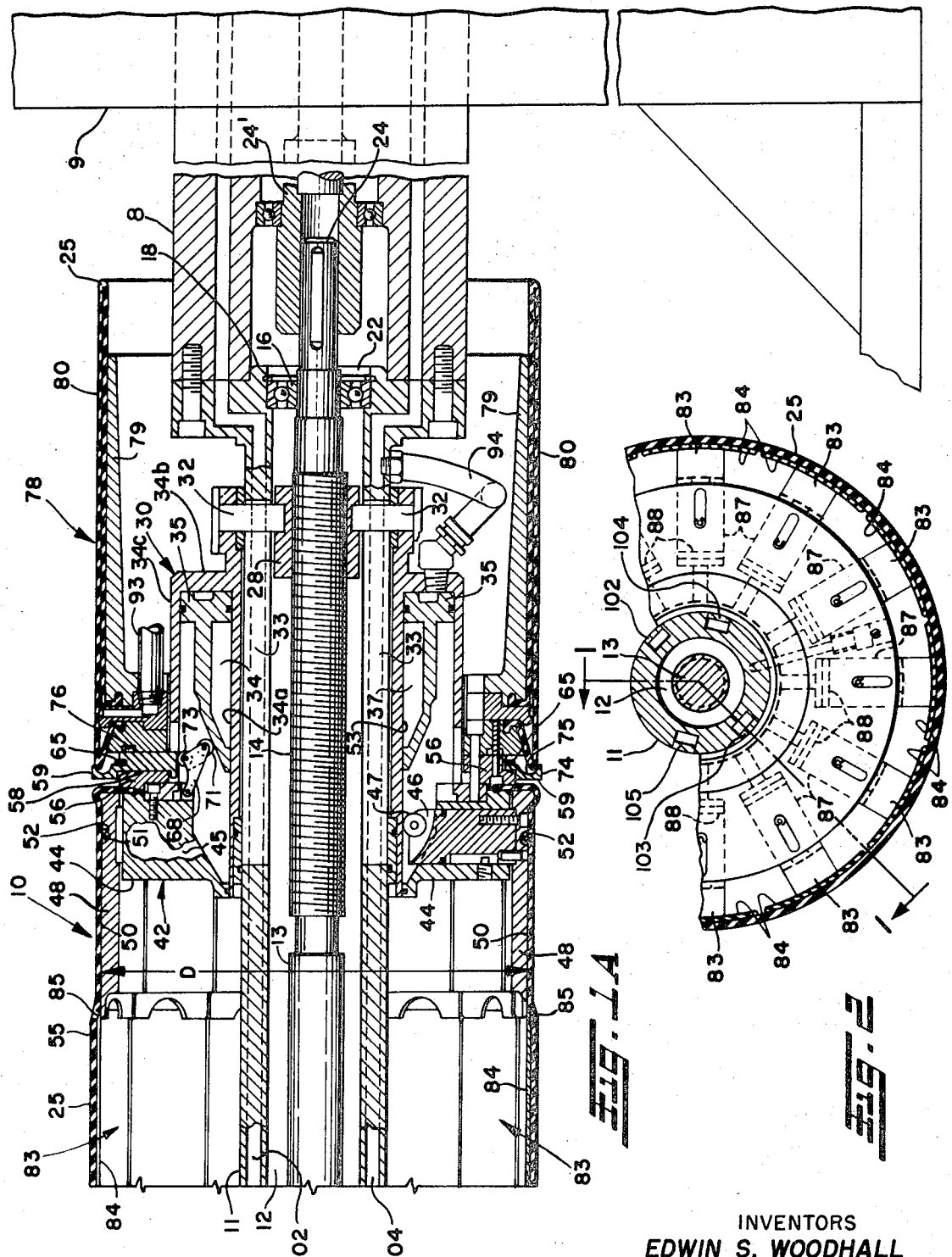

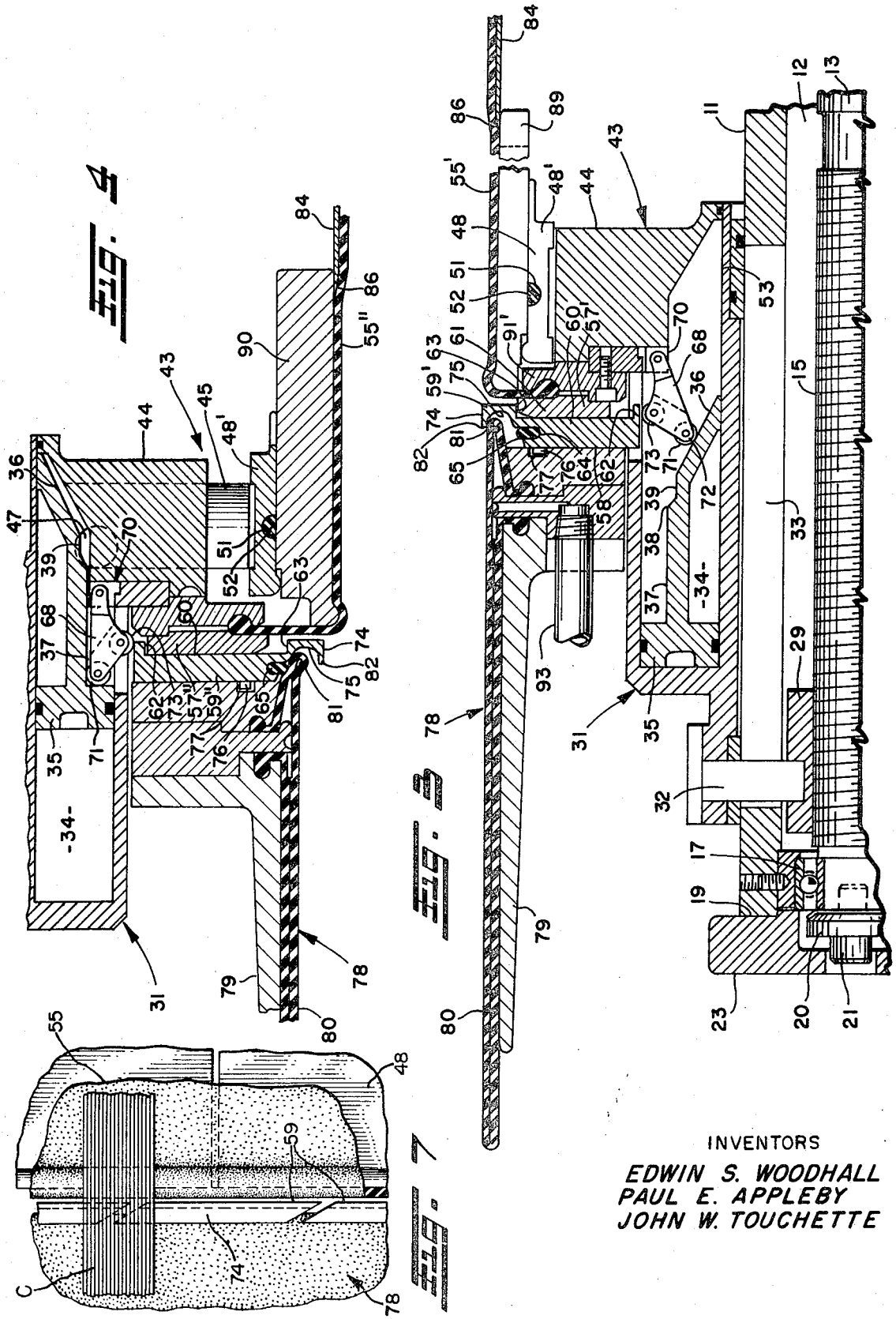

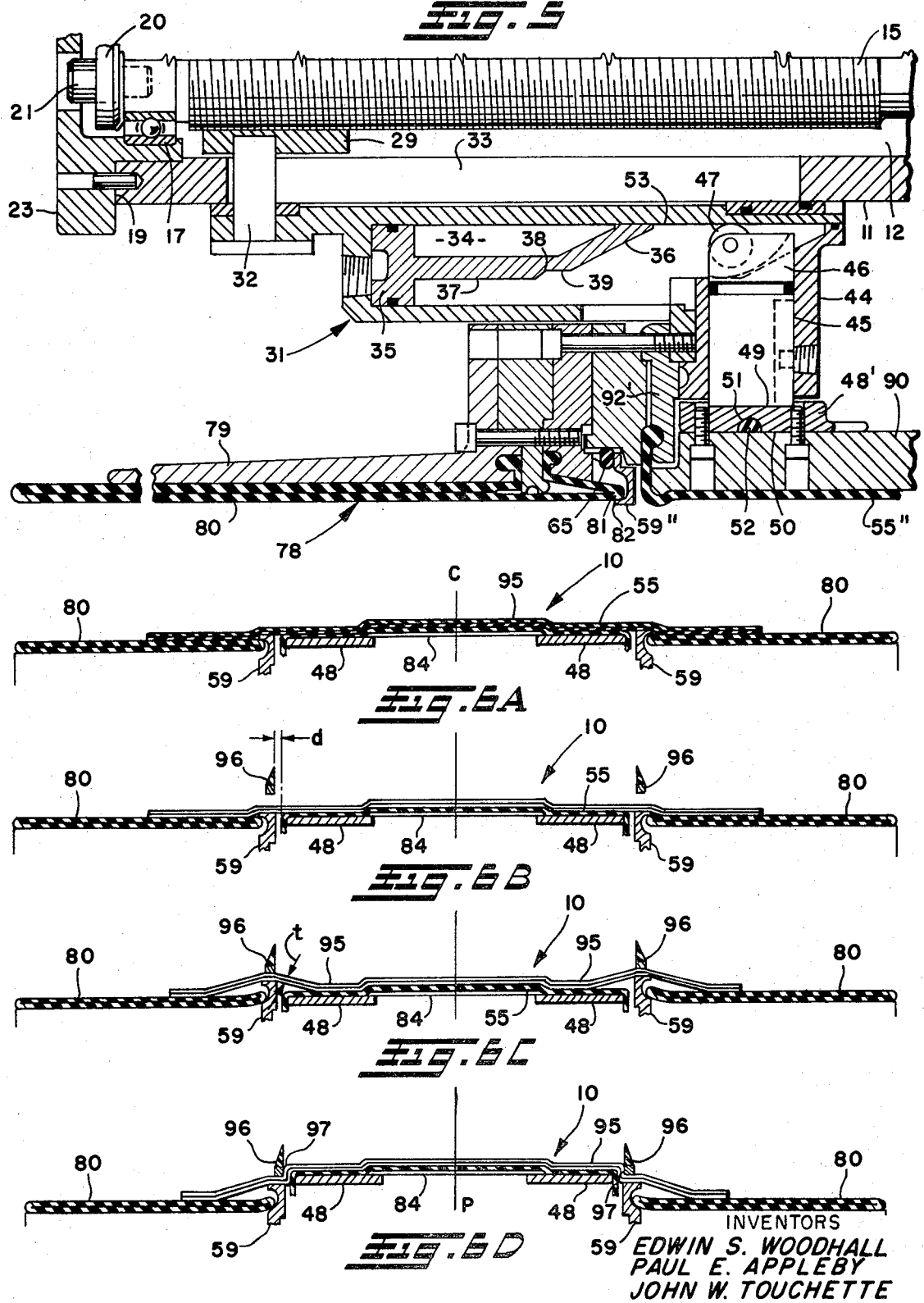

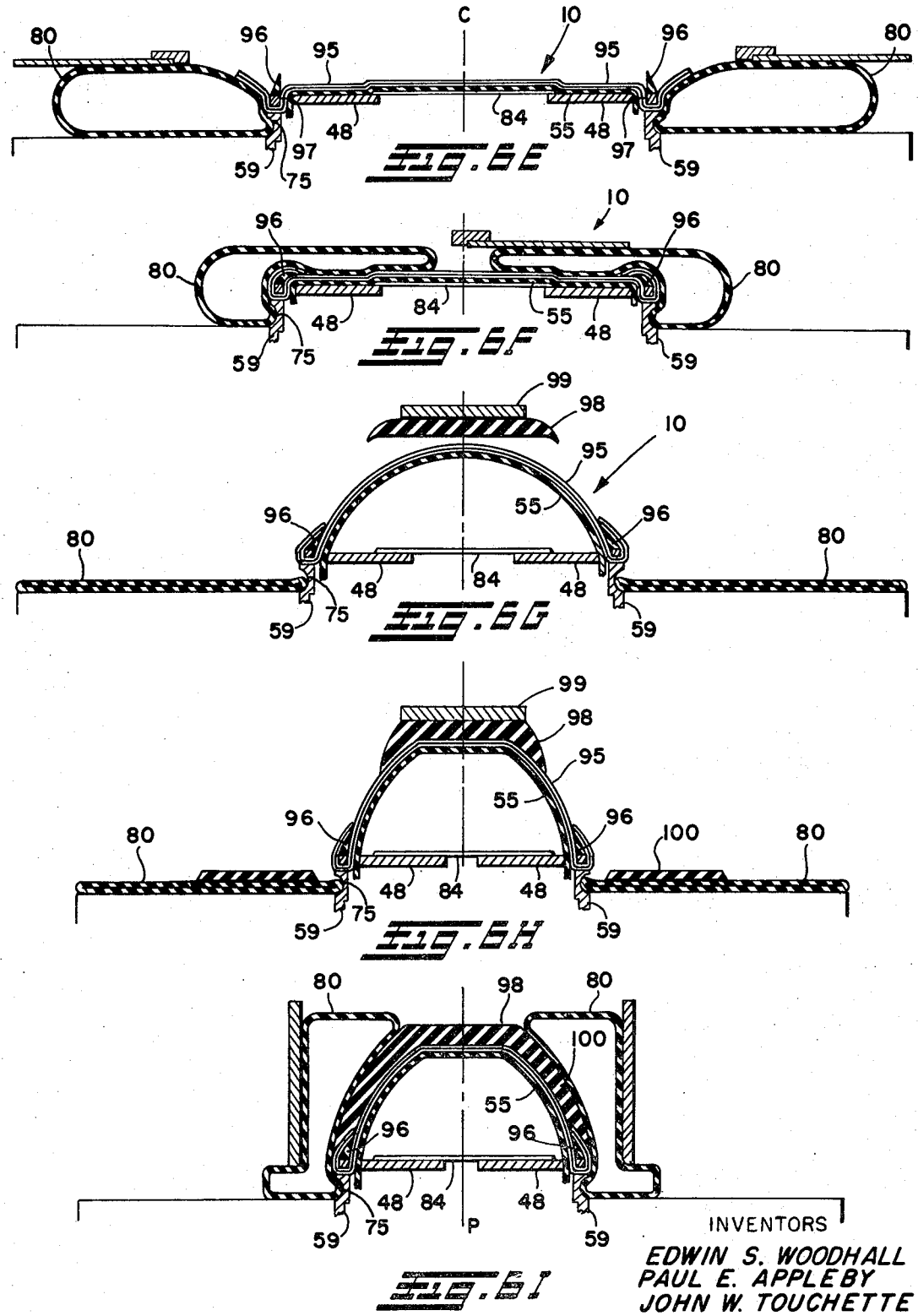

United States Patent Office 3,698,987
Patented Oct. 17, 1972

3,698,987
TIRE BUILDING DRUM
Edwin S. Woodhall and Paul F. Appleby, Cuyahoga Falls, and John W. Touchette, North Canton, Ohio, assignors to The Goodyear Tire & Rubber Company, Akron, Ohio
Filed Dec. 18, 1970, Ser. No. 99,428
Int. Cl. B29h 17/22
U.S. Cl. 156—401
43 Claims

ABSTRACT OF THE DISCLOSURE

A tire building machine comprising an expansible drum on which tires are built. The drum includes a pair of sets of segments movable radially of the drum axis and which are covered with a rubber sleeve and are disposed between two sets of fingers which are also movable radially of the drum axis. The fingers are designed to hold a pair of wire beads concentrically of the longitudinal axis of the building drum in equidistant spaced relation from the centerplane of the drum. The segments are movable radially outwardly of the drum to form shoulders in the carcass plies on which the beads may be seated, after which the turn-up of the plies and tie-in of the wire beads are made, and tread and sidewall are applied to complete the uncured tire. The fingers and segments have rigid material engaging surfaces. The center section of the building drum intermediate the segments has a substantially rigid material supporting surface and, together with the segments, provides a firm working surface for building the tire.

---

The foregoing abstract is not to be taken as limiting the invention of this application, and in order to understand the full nature and extent of the technical disclosure of this application, reference must be made to the accompanying drawings and the following detailed description.

This invention relates to tire building machines and more particularly to a novel and improved tire building machine for building radial-belted tires.

It is the primary object of the present invention to provide a tire building machine which will provide increased accuracy in the location of the components of the tire, particularly the beads, during the building process.

It is further an object of the invention to provide such a tire building machine which is capable of being readily modified to vary the sizes and diameter of tire which may be built on the machine.

It is still further an object of this invention to provide a tire building machine having a novel and improved drum which is expandable between two cylindrical configurations of different diameters and which is capable of shaping a tire carcass to toroidal shape while at the same time providing a substantially rigid building surface in both cylindrical configurations thereof.

Other objects will be in part obvious, and in part pointed out more in detail hereinafter.

The invention accordingly comprises the features of construction, combination of elements and arrangement of parts which will be exemplified in the construction hereafter set forth and the scope of the application of which will be indicated in the appended claims.

In the drawings:

FIG. 1-1A is a longitudinal, partially offset cross-sectional view, taken substantially along the lines 1—1 of FIG. 2, of a building machine constructed in accordance with the invention;

FIG. 2 is a section of the drum of FIG. 1 viewed substantially from the line 2—2 of FIG. 1;

FIG. 3 is a partial section of the drum of the machine of FIGS. 1 and 2 as modified to decrease the length thereof and increase the diameter thereof;

FIG. 4 is a partial section of the drum of FIG. 3 as modified to further increase the diameter thereof;

FIG. 5 is another partial section of the drum of FIG. 4, the fingers and segments being shown in their fully retracted positions relative to the longitudinal axis of the drum;

FIGS. 6A–6I are a series of schematic diagrams showing the sequential operation of the building machine; and FIG. 7 is a fragmentary plan view of a portion of the drum of the machine of FIGS. 1–1A.

Referring generally to the drawings, and more particularly to FIGS. 1–1A, there is shown a building machine comprising a drum 10 which in turn comprises an elongated hollow shaft 11 having an axial bore 12. A drive screw 13 with a pair of oppositely threaded portions 14 and 15, is centrally disposed within the bore 12 of the shaft 11. The drive screw 13 is journalled in a pair of bearings 16 and 17 disposed at adjacent inboard and outboard ends 18 and 19, respectively, of the drum shaft 11, for rotation about the longitudinal axis of the building drum 10, which coincides with the longitudinal axes of the drum shaft 11 and drive screw 13. A washed and nut assembly 20 is mounted on the outboard end 21 of the drive screw 13 for preventing axial movement of the drive screw 13 in the bore 12.

The inboard end 24 of the drive screw 13 protrudes from the building drum 10 for coupling engagement with a drive shaft 24' for rotating the drive screw 13 to axially expand and contract the drum. The shaft 24' is cantilever supported on the main housing or head stock 9 of the tire building machine of which the drum 10 is a part. A drive shaft 8 disposed coaxially about the drive shaft 24' also extends in cantilever fashion from the head stock 9 and is fixed to a flange at one end of the drum shaft 11 to support the drum and to rotatably drive the same.

A pair of nuts 28 and 29 are threadably mounted on the threaded portions 14 and 15 of the drive screw 13 for movement along the longitudinal axis of the building drum 10 in response to rotation of the drive screw 13. A pair of annular hubs 30 and 31 are slidably mounted on the drum shaft 11 for movement coaxially thereof and are keyed by sets of similar pins 32 to the nuts 28 and 29. The pins 32 extend through and are slidable in slots 33 in the shaft 11 which extend parallel to the rotational axis of the shaft. The pins thus prevent rotation of the hubs 30 and 31 and nuts 28, 29 about the shaft 11. The hubs 30 and 31 are equally spaced from the centerplane CP of the drum 10. The centerplane of the drum is a plane disposed midway between the ends of the drum and extending at right angles to the rotational or longitudinal axis of the drum. With reference to FIG. 1–A, the hubs 30 and 31 each comprises an inner cylindrical portion 34a slidably mounted on the shaft 11 and an annular flange 34b extending radially of the inner portion 34a from a point intermediate the ends thereof. The radially outer end of the flange 34b terminates in an outer second cylindrical portion 34c extending axially inwardly of the drum in radially spaced relation to the inner portion 34a to form an annular chamber 34 disposed concentrically of the drum axis.

An annular piston 35 is slidably mounted in the chamber or cylinder 34. Mounted for movement with each piston is a cam 36 comprising, as shown in FIG. 1, a cylindrical surface 37 extending from the piston 35 and coaxially inwardly of the drum. The surface 37 terminates at its inner end in one end of a conical surface or ramp 38 extending coaxially of the surface 37 and terminating at its other smaller diameter end in a relatively short cylindrical surface 39 also coaxial with the surface 37. The inner end of the surface 39 terminates in a conical surface 36a extending coaxially of the shaft 11. The surface 36a extends from the surface 39 toward the shaft 11 and is a part of a generally conical portion of the cam 36, the inner smaller diameter end portion of which is slidably engaged coaxially over the shaft 11.

The drum 10 further comprises a pair of segment assemblies 42 and 43 each disposed in concentric relation around the longitudinal axis of the building drum 10, and each equally spaced in parallel relation from the centerplane CP of the building drum 10. The segment assemblies 42 and 43 each comprises a housing 44 which is fixed to one of the hubs 30, 31. A plurality of bores 45 are provided in each of the housings 44 in equi-angularly spaced relation about the longitudinal axis of the drum. The bores 45 extend radially of the axis of the drum and are in communication with the annular bores 34 of the hubs 30, 31.

A lifter member or rod 46 is slidably received in each of the bores 45 for movement radially of the drum. Each lifter rod 46 carries at its inner end a roller 47 for rolling engagement with the ramp 36a of the cam 36 when the associated piston 35 moves in an axial direction towards the centerplane of the drum. As illustrated in FIG. 4, the rollers 47 of the lifter rods 46 rest on the cylindrical surfaces 39 of the cams 36, when the lifter rods 46 are in their fully extended or radially outermost position relative to the longitudinal axis of the drum.

With further reference to FIGS. 1–1A, a segment 48 is mounted on the outer end of each lifter member 46. Each segment has at its radially outermost extremity a generally parti-cylindrical rigid surface 50 for supporting rubberized plies of carcass material. The parti-cylindrical surfaces 50 are disposed with their axes parallel to the axis of the drum, and in this instance the term parallel is intended to include the case where the axes of the parti-cylindrical surfaces 50 are coincident with the rotational axis of the drum.

The parti-cylindrical surfaces 50 of each set 42 and 43 of segments cooperate to provide a generally cylindrical surface in both the radially inner and outermost positions of the segments. Each segment 48 is provided with an arcuate groove 51 extending about the rotational axis of the drum which with the grooves of the remaining segments in each set defines a generally annular groove generally concentric with the drum axis for receiving a spring such as an elastomer O-ring 52 for biasing the segments 48 and lifter rods 46 radially inwardly of the longitudinal axis of the building drum. Thus, when the cams 36 are moved out of wedging relationship with the rollers 47 of the lifter rods 46, the rubber O-rings 52 act to return the segments 48 from their fully extended position to their rest positions closer to the longitudinal axis of the building drum 10, where the rollers 47 are engaged with the surface 53 of the annular cylinders 34.

A generally cylindrical sleeve 55, composed of any suitable elastomeric material, e.g., rubber, is disposed coaxially of the drum. The sleeve is disposed over the segments 48 and is secured at its ends to the housings 44 by a pair of annular clamping rings 56 and 57, which are fastened to the housings 44. The clamping rings 56 and 57, each have a plurality of slots 58, which extend radially of the longitudinal axis of the drum. The slots 58 in each clamping ring 56, 57, preferably, correspond in number to that of the bores 45 formed in the respectively associated housings 44.

With reference to FIGS. 1–1A, a bead gripping member of finger 59 is slidably mounted in each of the slots 58 of the clamping rings 56 and 57, for movement radially of the drum axis. For a reason to be hereinafter explained, the fingers 59 are offset about the drum axis relative to the next adjacent segment 48. The two sets of fingers 59 are equally spaced from the centerplane of the drum 10 a distance greater than are the segment assemblies 42 and 43. Each finger 59 is provided with a slot 60 extending at right angles to the next adjacent slots 58 in the next adjacent clamping ring, and the bases of the slots 58 are in sliding engagement. The outer end of each slot 60 forms a stop 63 for engaging the outer periphery of the next adjacent clamping ring 56 to limit movement of the finger 59 in a radial direction towards the longitudinal axis of building drum 10.

With reference to FIG. 1, each finger 59 is provided with an arcuate groove 64 extending about the drum axis, with the grooves 64 of the other fingers in each set thereof forming a circular groove for receiving a spring, such as an O-ring 65 composed of any suitable elastomeric material, e.g., rubber. The O-ring 65 acts to bias the fingers 59 in a direction towards the longitudinal axis of building drum 10.

A plurality of levers or links 68 are each associated with, and pivotally mounted at one end on, one of a pair of mounting rings 70 secured between a flange on the hubs 30, 31 and the adjacent housings 44 of the segment assemblies 42 and 43. Each lever 68 is operatively associated with one of the fingers 59. A roller 71 is mounted on the free end 72 of each lever 68 for rolling engagement along the cam 36 and onto the land 37 thereof. A second roller 73 is mounted intermediate the ends of each lever 68 and is engageable with the radially inner end of the respectively associated finger 59 to move the finger in a direction radially outwardly of the longitudinal axis of the building drum as the other roller 71 of the lever 68 is moved radially outwardly of the drum by the respectively associated cam 36. Each finger 59 has at its radially outermost extremity a rigid parti-cylindrical material engaging surface 74, the axis of which extends parallel to the longitudinal axis of the building drum 10. In other words, no portion of finger 59 extends radially outwardly beyond the surface 74. It is intended to include within the use of the term parallel as applied to the axis of a surface 74 the situation wherein the axis is coincident with the drum axis. In the at rest position of the fingers 59, the surfaces 74 are spaced from the drum axis a distance not substantially greater than the surfaces 50 of the segments 48.

An arcuate groove 75, extending about the drum axis is provided in each finger 59 in radially inwardly spaced relation and in registry with the material engaging surface 74 with the groove facing axially outwardly of the drum. The clamping rings 56 and 57 each carry a projecting annular lug 76 for registry in an annular groove 77 formed in an adjacent turn-up bladder assembly 78 located at an outboard end of the drum. Each bladder assembly comprises an auxiliary drum 79, which is disposed coaxially of the building drum 10 and an annular extensible turn-up bladder 80 which is composed of a suitable elastomeric material, e.g., rubber. Each turn-up bladder 80 has an annular end or nose portion 81 projecting into the arcuate grooves 75 formed in the next adjacent set of fingers 59. The turn-up bladders 80 in their deflated condition have an outer diameter substantially the same as that of the rubber sleeve 55 disposed over the segments 48. Each bladder 80 is anchored relative to its auxiliary drum 79 at a location closely adjacent to but spaced axially outwardly from the axially inboard end of the bladder thus forming the nose portion 81.

A plurality, e.g., twelve, of similar center segments or cover plates 84 are equi-angularly spaced around the longitudinal axis of the building drum 10, intermediate the segment assemblies 42 and 43. The cover plates 84 correspond in number to the segments 48 and fingers 59 and each consists of a parti-cylindrical member, the axis of which extends parallel to the longitudinal axis of the drum, and by parallel we mean to include coincidence with the drum axis. The cover plates 84 each have opposite ends 85 and 86, which are radially outwardly disposed in overlapped relation with respect to the adjacent segment 48. An operating piston 88, is associated with each cover plate 84 for moving the cover plate radially outwardly of the drum simultaneously with the respectively associated segments 48. The cover plates 84 provide support for the carcass plies between the segments 48, and together with the segments 48 provide a firm working surface on which the tire is built. The pistons 88 are respectively slidably engaged in a plurality of bores or cylinders extending radially inwardly of and from the outer periphery of an annular member 87 disposed coaxially over the shaft 11. The cover plates 84 being in overlapped relation with the segments 48, do not hinder movement of the segments 48 when the drive screw 13 is operated to move the hubs 30 and 31 toward and away from the centerplane of the building drum 10. The cover plates 84 preferably are sufficiently thin that the diameter of the center portion of the drum is not substantially greater than that of the end portions and yet sufficiently thick that the center portion provides a firm working surface for building the tire.

The overall diameter D of the segments 48 in their rest positions, as shown in FIG. 1A, is sufficient to build a tire carcass with a 13 inch tire bead suitable for mounting on a conventional 13 inch rim. The diameter of the tire drum 10 may be increased by mounting extensions or blocks on the segments. For example, blocks 89 (FIG. 3) and 90 (FIGS. 4 and 5), variable in thickness by one-half inch, are removably mounted on the segments 48' to increase the building diameter of the tire drum 10 for building tires with 14 and 15 inch tire bead suitable for mounting on corresponding size conventional rims. As will be seen from a comparison of the segments 48 and 48', the segments are provided in different lengths to provide for different size tires of the same bead diameter. Different fingers 59', 59'', greater in overall length, as measured radially of the drum, by increments of one-half inch, are also used in corresponding relation to the size block and building diameter required. Moreover, correspondingly dimensioned adapter rings 91' and 92' are used to seat and hold the ends of a larger rubber sleeve 55', 55'', which is clamped in position by clamping rings 56' and 57', which are also in corresponding relation to the size of the adapter rings 91' and 92' and extension blocks 89 and 90.

As shown in FIG. 2 air passages 102, 103, 104 and 105 are provided in the shaft 11 and extend longitudinally thereof. For the purpose of illustration, two of these passages 102 and 104 are shown in FIGS. 1-1A rotated from their actual position as shown in FIG. 2 into the plane of FIGS. 1-1A. The passages extend outwardly of the end of the shaft 11 which is supported by the head stock 9 for connection to suitable sources of pressurized air. The passage 104 extends substantially the full length of shaft 11. A pair of air hoses 94 are connected at one end to the passage 104 adjacent its ends, and at their other ends to the hubs 30 and 31 for supplying air to actuate the pistons 35 for effecting movement of the segments 48 and fingers 59. The annular member 87 housing the pistons 88 of the cover plates 84 is provided on its inner periphery with an annular groove 108 which communicates with the passage 104 and provides a manifold for the supply of air to actuate the pistons 88. A plurality of radially extending passages 106 in the member 87 provide communication between the manifold 108 and the pistons 88. The passage 105 extends substantially the full length of the shaft 11 as in the case of the passage 104, and is connected adjacent its opposite ends by hoses 93 to the bladders 80. The passage 102, as illustrated in FIG. 1, and in like manner the passage 103, terminates at its inner end adjacent the annular member 87 housing the pistons 88. More specifically, the inner end of each passage 102, 103 extends slightly beyond the annular member 87 and opens outwardly of the shaft 11 on both sides of the annular member 87. Accordingly, air pressure introduced through the passages 102, 103 will effect expansion of the sleeve 55. A blocking plate 107 serves to seal the manifold 108 in the annular member 87 from the passage 102, it being understood that there is a similar arrangement with respect to the passages 103, 105 in order to isolate the manifold therefrom.

Referring more particularly to FIGS. 6A-6I, there is shown a predetermined number of plies 95 of tire fabric formed into a cylinder by disposing the ply or plies about the building drum 10 with the ends of the ply or plies extending beyond the ends of the drum. As shown in FIG. 6B, wire beads 96 are then located concentrically and axially inwardly of the ends of the carcass in radially outwardly spaced relation to the carcass and in predetemined equally spaced relation from the centerplane of the building drum 10. Pressurized air is then introduced into the passage 104 to actuate the annular pistons 35 to move the cams 36 longitudinally of the drum and effect movement of the fingers 59 simultaneously radially outwardly of the drum to clampingly engage the carcass plies 95 against the inner periphery of the wire beads 96 as shown in FIG. 6C. even though pressurized fluid in the passage 104 serves to actuate the pistons 88 of the cover plates 84, the initial introduction of pressurized fluid into the passage 104 will not result in movement of the pistons 88 as these pistons do not provide sufficient power to move the cover plates against the action of the elastomeric sleeve 55. The fingers 59 concentrically position the wire beads 96 relative to the building drum 10. The levers 68 for operating the fingers 59, are in locked position on the land 37, as the pistons 35 move further out of the bores 34 to effect expansion of the lifter members 46 and correspondingly move the segments 48 in a radial direction away from the longitudinal axis of the building drum 10. As the segments 48 expand the sleeve 55, the piston 88 is then permitted to move the cover plates outwardly of the drum to support the center of the sleeve 55. Simultaneously, the mechanism for rotating the drive screw 13 is operated to move the hubs 30 and 31 together in predetermined closer spaced relation to the centerplane CP of the building drum 10 (FIG. 6D). Accordingly, and while the tire fabric remains clampingly engaged with the inner periphery of the bead, the portion of the tire fabric disposed between the beads is radially expanded and axially contracted so as to provide that portion of the fabric with a pair of annular shoulders extending radially of the drum and in engagement with the sides of the beads facing axially inwardly of the drum. The shoulders 97 formed in the tire fabric terminate at their outer ends at a diameter greater than the outer diameter of the beads 96 and in a generally cylindrical portion of greater diameter than that at which the tire fabric was initially laid about the drum. In order to assure that the shoulders 97 are tightly engaged with the sides of the beads, each bead 96 is initially located axially outwardly of the drum 10 a distance $d$ which is no greater than, and preferably is slightly less than, the thickness $t$ of the tire building material disposed between the bead and the drum. As a result when the material is expanded radially during radial expansion of the ends of the drum the material forming the shoulder 97 will be tightly engaged with the inwardly facing sides of the beads and where the distance $d$ is less than the thickness $t$ of the material, the beads will be moved slightly axially outwardly of the drum during formation of the shoulders 97.

During expansion of the drum for the first diameter of FIG. 6A to the second larger diameter of FIG. 6D, the previously mentioned angular offsetting of the segments 48 and fingers 59 about the drum axis assures that there will be no loose cords in the plies when biulding radial ply tires which the cords of the plies extend essentially parallel to the drum axis. More particularly, the space between each next adjacent pair of bead gripping fingers 59 is, in both diameters of the drum, wholly in registry with the surface 50 of a next adjacent segment 48. Thus, even in the second larger diameter of the drum the spaces between next adjacent finger 59 and segments 48 do not provide a continuous groove over the full length of the drum and into which cords may droop when the drum is expanded. With reference to FIG. 7, to assure equal tension in all the cords of a radial carcass when the drum is expanded to the diameter of FIG. 6D, each of the bead gripping members or fingers 59 is mitered at each end of the portion thereof forming the material supporting surface 74 in mating relation to the next adjacent fingers 59. More particularly, each end of each of these portions of the fingers 59 extends at an acute angle relative to the longitudinal axis of the drum and parallel to the next adjacent end of the next adjacent corresponding portion of the next adjacent finger. The angle at which the ends of these portions of the fingers extend relative to the drum axis is determined by the gap between these end portions when the fingers are in their radially retracted position of FIG. 1, and the distance that the fingers are moved radially outwardly to their outermost position. The angle is selected so that with the fingers in their outermost positions, and with the tire cords extending over the fingers and parallel to the axis of the drum, as indicated at C in FIG. 7, each cord in the area of the gap between the fingers will be supported by a portion of a finger 59. Thus, the mating mitered ends of each next adjacent pair of fingers are in overlapping relationship in both the innermost and outermost diameter of said bead gripping means.

While the material 95 remains clampingly engaged with the beads, the turn-up bladders 80 are then inflated and rolled over the beads to make the ply turn-up and tie-in of the wire beads 96 (FIGS. 6E–6F). During the ply turn-up operation the nose of each bladder is trapped in the grooves 75 of the fingers 59 resulting in a tight turn-up around the beads. The bladders 80 are then deflated, and the center bladder or sleeve 55 is inflated and the drum is axially contracted to preform the carcass plies 95 to a generally toroidal shape for receiving a tread 98 (FIG. 6H). Sidewalls 100 are placed on the turn-up bladders 80 and moved into position on the carcass plies 95 (FIGS. 6H–6I). The bladders 80 and center bladder or sleeve 55 are then deflated and the cams 36 returned to their rest position permitting radial retraction of the segments 48 and fingers 59 by the rubber O-rings 52 and 65 to their rest positions close to the longitudinal axis of the building drum 10, thereby permitting removal of the finished uncured tire carcass for placing in a mold suitable for curing or vulcanizing the carcass.

Thus, there has been provided an improved tire building machine incorporating mechanisms for clamping the beads and maintaining them in concentric relation to the longitudinal axis of the drum and in positions equally spaced from the centerplane of the building drum during substantially the entirety of the building operation, such that other components of the time can be more accurately applied to the carcass plies.

While certain representative embodiments and details have been shown for the purpose of illustrating the invention, it will be apparent to those skilled in the art that various changes and modifications may be made therein without departing from the spirit or scope of the invention.

What is claimed is:

1. A tire building machine comprising a drum of generally cylindrical configuration and including means at each end for effecting radial expansion of the end portions of the drum from a first diameter to a second larger diameter, bead gripping means disposed axially outwardly of and closely adjacent each end of the drum, each bead gripping means being expandable radially of the drum between a first diameter not substantially greater than said first diameter of the said end portions and a second larger diameter substantially less than said second diameter of said end portions, means for expanding each of said bead gripping means to said second diameter thereof, and means for expanding each of said end portions to said second diameter subsequent to expansion of said bead gripping means to said second diameter thereof.

2. A tire building machine as claimed in claim 1, wherein said drum further comprises means for moving said end portions and the bead gripping means axially inwardly of the drum simultaneously with the expansion of said end portions.

3. A tire building machine as claimed in claim 1, in which each said bead gripping means has at its radially outermost extremity a parti-cylindrical surface registerable with a tire bead for supporting the same in concentric relationship to the drum.

4. A tire building machine as claimed in claim 1, wherein said drum further comprises a center portion disposed between said end portions and with said end portions forming a generally cylindrical rigid surface when said end portions are at said first diameter thereof, means for radially expanding said center portion simultaneously with the radial expansion of said end portions, said center portion with said end portions forming a generally cylindrical rigid surface when said end portions are at said second diameter thereof.

5. A tire building machine as claimed in claim 2, wherein said drum further comprises an elastomeric sleeve disposed coaxially over said end and center portions of the drum, the ends of the sleeve being fixed radially relative to the axis of the drum, and means for inflating said sleeve simultaneously with movement of the end portions of the drum toward each other.

6. A tire building machine as claimed in claim 4, wherein said drum further comprises an elastomeric sleeve disposed coaxially over said end and center portions of the drum, the ends of the sleeve being fixed radially relative to the axis of the drum, means for moving said end portions of the drum and the bead gripping means axially inwardly or the drum simultaneously with the expansion of said end portions, and means for inflating said sleeve simultaneously with movement of the end portions of the drum toward each other.

7. A tire building machine as claimed in claim 5, further comprising a pair of auxiliary drums disposed respectively at the oupposite ends of said drum, and an inflatable turn-up bladder supported on each of said auxiliary drums.

8. A tire building machine as claimed in claim 6, further comprising a pair of auxiliary drums disposed respectively at the opposite ends of said drum, and an inflatable turn-up bladder supported on each of said auxiliary drums.

9. A tire building machine as claimed in claim 2, in which each bead gripping means comprises a plurality of rigid members circularly arranged concentrically of the next adjacent end portion of the drum, each of said members being mounted for movement radially of the drum axis, said means for expanding each bead gripping means comprising cam means movable coaxially of the drum and operatively associated with said rigid members.

10. A tire building machine as claimed in claim 9, in which each next adjacent pair of said rigid members have next adjacent ends extending at acute angles to the longitundinal axis of the drum, whereby said ends are in overlaping relationship in both said first and second diameters of said bead gripping means.

11. A tire building machine as claimed in claim 9, wherein said drum further comprises means forming an annular chamber extending coaxially of the drum axis and disposed adjacent each end of the drum, and an annular piston disposed in each chamber, said cam means being mounted for movement with said piston.

12. A tire building machine as claimed in claim 11, wherein each cam means comprises a conical surface inclined outwardly of the drum axis and at its outer end terminating in a cylindrical surface disposed coaxially of the drum axis, said conical surface being operative to move the associated rigid members radially outwardly of the drum axis and said cylindrical surface being operative to lock said associated rigid members in their radially outermost position.

13. A tire building machine as claimed in claim 9, further comprising a pair of auxiliary drums disposed respectively adjacent the end portions of the drum and mounted for movement axially of the drum with said end portions and bead gripping means, an inflatable turn-up bladder supported on each of said auxiliary drums and in its uninflated condition being generally cylindrical and disposed coaxially of the drum axis, one end of each bladder being disposed next adjacent the respectively associated bead gripping means, each of said rigid members of said bead gripping means being provided with an arcuate groove extending about the drum axis and receiving the next adjacent end portion of the respectively associated bladder.

14. A tire building machine as claimed in claim 12, wherein each of said rigid members is provided at its radially outermost extremity with a parti-cylindrical surface having its axis extending parallel to the axis of the drum.

15. A tire building machine as claimed in claim 1, wherein each means for effecting expansion of an end portion of the drum comprises a plurality of segments circularly arranged concentrically of the drum axis and each having at its radially outermost extremity a rigid generally parti-cylindrical surface, a plurality of lifter members respectively associated with and mounted for movement with said segments, said lifter members extending radially inwardly of the drum axis, and means for guiding said lifter members for movement radially of the drum axis.

16. A tire building machine as claimed in claim 15, further comprising cam means operatively associated with the lifter members.

17. A tire building machine as claimed in claim 16, wherein said drum further comprises means at each end thereof forming an annular chamber disposed coaxially of the drum axis, an annular piston disposed in said chamber, said cam means being mounted for movement with said piston.

18. A tire building machine as claimed in claim 17, wherein said cam means comprises a conical surface arranged concentrically of the drum axis and terminating in its outer end in a cylindrical surface operative to lock said lifter members and segments in their radially outermost positions.

19. A tire building machine as claimed in claim 1, wherein said means for effecting expansion of each end portion of the drum comprises a plurality of radially movable members, each bead gripping means comprising a plurality of radially movable members, the means for effecting expansion of each of said end portions of the drum and the means for expanding the bead gripping means next adjacent each of said end portions comprising common cam meas movable coaxially of the drum, means operatively connecting said radial movable members of the bead gripping means with the cam means when the bead gripping means are in said first diameter thereof, means for operatively connecting said cam means and said radially movable members for expanding the end portion of the drum, and means to move said cam means to effect sequential movement of said bead gripping means and end portions to said second diameters thereof.

20. A tire building machine as claimed in claim 19, wherein said radially movable end portions of the drum are offset about the drum axis with respect to the radially movable member of said bead gripping means.

21. A tire building machine as claimed in claim 19, wherein said drum further comprises means mounting the radially movable members for effecting expansion of each end portion of the drum and said radially movable members of the next adjacent bead gripping means and the associated cam means for movement together axially of the drum.

22. A tire building machine as claimed in claim 21, wherein said drum further comprises means adjacent each end thereof providing an annular chamber extending coaxially of the drum, and an annular piston received in said chamber, said cam means being mounted for movement with said piston.

23. A tire building machine as claimed in claim 22, wherein said common cam means includes a conical surface disposed coaxially of the drum and terminating at the radially outer end thereof in one end of a cylindrical surface disposed coaxially of the drum and which at its other end terminates at one end of a second conical surface disposed coaxially of the drum, said second conical surface being inclined radially outwardly of the drum axis from said one end thereof and terminating at its other end at one end of a second cylindrical surface disposed coaxially of the drum.

24. A tire building machine as claimed in claim 23, wherein said means operatively connecting the radially movable members of each bead gripping means with said cam means comprises a plurality of levers respectively associated with the last mentioned radially movable members, each of said last mentioned members being pivoted at one end for movement about an axis fixed radially relative to the axis of the drum, the other end of each lever carrying a roller engageable with said cam means, and a second roller mounted intermediate the ends of each lever and engageable with the respectively associated radially movable member of said bead gripping means.

25. A tire building machine as claimed in claim 15, wherein said means for guiding said lifter members at each end of the drum comprises a member extending about the drum axis and movable longitudinally of the drum axis, said bead gripping means at each end of the drum comprising a plurality of fingers circularly arranged concentrically of the drum axis, and means on the last mentioned member slidably supporting said fingers for movement radially of the drum axis.

26. A tire building machine as claimed in claim 15, wherein said means for guiding said lifter members comprises a housing disposed coaxially of the drum, means for moving said lifter members radially outwardly of the drum axis, an elastomeric sleeve disposed over said segments, means fixing each end of the sleeve relative to the next adjacent housing comprising a clamping ring disposed axially outwardly of the drum relative to the housing, said bead gripping means at each end of the drum comprising a plurality of fingers circularly arranged concentrically of the drum axis, means on the clamping ring slidably receiving said plurality of fingers and guiding the same for movement radially of the drum axis, and means for moving the housings and bead gripping means axially inwardly of the drum simultaneously with the movement of said lifter members radially outwardly of the drum axis.

27. A tire building machine as claimed in claim 26, wherein each of said fingers at its radially outermost extremity is provided with a rigid parti-cylindrical surface registerable with a tire bead for supporting the same in concentric relationship to the drum.

28. A tire building machine as claimed in claim 27, in which the parti-cylindrical surfaces of said segments are offset angularly about the drum axis with respect to the parti-cylindrical surfaces of said fingers.

29. A tire building machine as claimed in claim 26, wherein said drum further comprises a rotatable shaft extending coaxially of the drum, a hub slidably mounted on the shaft adjacent each end of the drum for movement longitudinally of the shaft, each hub being connected to one of said housings for movement therewith, means providing each hub with an annular chamber disposed coaxially of the drum axis, an annular piston disposed in each chamber, and means for connecting said annular piston to said lifter members in said housing and to said fingers respectively associated therewith for effecting sequential movement of said fingers and lifter members radially outwardly of the drum in response to movement of said annular piston longitudinally of the drum axis.

30. A tire building machine including a drum comprising a plurality of circularly arranged bead gripping members disposed concentrically of the drum axis at each end of the drum, said bead gripping members being movable radially of the drum axis, a generally annular inflatable bladder disposed coaxially of the drum and axially outwardly of the drum with respect to the bead gripping members, the bladder being anchored relative to the drum axis adjacent the bead gripping members and having a nose portion extending toward the bead gripping members, and means on the bead gripping members receiving the nose portion of the bladder when the bladder is deflated and trapping said nose portion during inflation of the bladder.

31. A tire building machine as claimed in claim 30, wherein each of said bead gripping members is provided with a parti-cylindrical surface extending about the drum axis, said means for receiving the nose portion of the bladder comprising an arcuate groove in each bead gripping member disposed radially inwardly of and in registry with said parti-cylindrical surface.

32. A tire building machine including a drum comprising a plurality of circularly arranged bead gripping members disposed concentrically of the drum at each of the opposite ends thereof, each bead gripping member having at its radially outermost extremity a parti-cylindrical surface registerable with a tire bead for supporting the same in concentric relationship to the drum, means mounting said bead gripping members for movement radially of the drum axis from a first diameter substantially equal to the diameter of the drum to a second larger bead gripping diameter, and means for moving said bead gripping members simultaneously radially outwardly of the drum axis comprising cam means.

33. A tire building machine as claimed in claim 32, in which each next adjacent pair of bead gripping members have next adjacent end portions extending at acute angles to the longitudinal axis of the drum, whereby said end portions are in overlapping relationship in both said first and second diameters of said bead gripping members.

34. A tire building machine as claimed in claim 32, wherein said cam means comprises, in association with the bead gripping members at each end of the drum, a conical surface arranged coaxially of the drum axis, and means mounting said cam means for movement longitudinally of the drum axis.

35. A tire building machine as claimed in claim 34, in which said means mounting said cam means comprises means forming an annular cylinder disposed coaxially of the drum, and an annular piston slidably received in said cylinder, said cam means being mounted for movement with said piston.

36. A tire building machine as claimed in claim 35, further comprising adjacent each end of the drum an end member mounted for movement with said means forming said cylinder in a direction longitudinally of the drum axis, means on said end member for guiding said bead engageable members for movement radially of the drum axis.

37. A tire building machine as claimed in claim 36, further comprising a link respectively associated with each of said bead griping means, one end of the link being pivoted on the next adjacent end member for moving generally radially of the drum axis, means on the other end of said link cooperably engageable with said conical member, and means intermediate the ends of said link engageable with the respectively associated bead gripping member for movement of the bead gripping member radially outwardly of the drum axis in response to movement of said piston in a direction longitudinally of the drum axis.

38. A tire building machine including a drum comprising a pair of end members disposed at opposite ends respectively of the drum, a plurality of circularly arranged lifter rods disposed concentrically of each end of the drum and slidably supported by the next adjacent end member for movement radially of the drum axis, each lifter rod carrying at its outer end a segment having a parti-cylindrical outer surface, a hub at each end of the drum provided with an annular cylinder disposed concentrically of the drum axis, an annular piston received in said cylinder, a conical cam disposed coaxially of the drum and mounted for movement with each piston, cam follower means on each lifter rod engageable with such cam to effect radially outward movement of the respectively associated segments in response to movement of said piston longitudinally of the drum, and means connecting each end member with the next adjacent hub for movement of the two simultaneously and longitudinally of the drum axis.

39. A tire building machine including a drum comprising at each end thereof a plurality of circularly arranged rigid segments circularly aranged concentrically of the drum axis, means mounting said segments for movement radially of the drum axis, the segments at one end of the drum being spaced apart axially of the drum from the segments at the other end thereof, a plurality of substantially rigid parti-cylindrical cover plates disposed between the segments at each end of the drum, said cover plates being circularly arranged concentrically of the drum axis, the ends of said cover plates being in overlying engagement with the respectively next adjacent ends of the segments and means for moving said cover plates radially of the drum axis simultaneously with the movement of said segments whereby said drum provides a rigid cylindrical material supporting surface over the entire length thereof in said first diameter and said second diameter of said segments.

40. A tire building machine as claimed in claim 39, further comprising means for moving the segments at each end of the drum toward and away from the segments at the other end of the drum, said cover plates being slidably engaged with said segments whereby said segments telescope within said cover plates during movement axially inwardly of the drum.

41. A tire building machine as claimed in claim 40, further comprising an elastomeric sleeve disposed about said segments and cover plates, the ends of said sleeves being anchored relative to said segments, and means for inflating said sleeve during movement of said segments axially inwardly of the drum.

42. A tire building machine including an expandable tire building drum, said drum comprising at each end thereof a set of circularly arranged segments disposed concentrically of the drum axis, each segment including a rigid parti-cylindrical material supporting surface facing radially outwardly of the drum, means for moving said segments radially of the drum axis from a first diameter to a second larger diameter wherein said segments are spaced apart in a direction circumferentially about the drum axis, a set of bead gripping members respectively associated with each set of segments, each set of bead gripping members comprising a plurality of the same circularly arranged and disposed concentrically of the drum axis, said bead gripping members being disposed axially outwardly of the drum with respect to the respectively associated set of segments, each bead gripping member comprising a parti-cylindrical rigid surface extending about the drum axis, said bead gripping members being mounted for movement radially of the drum axis between a first diameter and a second larger diameter wherein said bead gripping members are spaced apart in a direction circumferentially about the drum axis, the bead gripping members being disposed about the drum axis with respect to the respectively associated set of segments to provide that when the segments are in said second diameter thereof the space between next adjacent segments is wholly in registry with a parti-cylindrical surface on a next adjacent one of said bead gripping members.

43. A tire building machine as claimed in claim 42, in which said parti-cylindrical surface of each bead gripping member is disposed at the radially outermost extremity thereof, the portions of each next adjacent pair of bead gripping members forming said parti-cylindrical surfaces thereof having next adjacent end portions extending at acute angles to the longitudinal axis of the drum, which said end portions are in overlapping relationship in both said first and second diameters of said bead gripping members.

References Cited

UNITED STATES PATENTS

| 2,614,952 | 10/1952 | Kraft | 156—402 |
| 3,035,629 | 5/1962 | Vanzo et al. | 156—403 |
| 3,053,308 | 9/1962 | Vanzo et al. | 156—132 X |
| 3,111,443 | 11/1963 | Vanzo et al. | 156—401 X |
| 3,134,079 | 5/1964 | Giletta et al | 156—132 |
| 3,184,361 | 5/1965 | Allitt | 156—398 X |
| 3,188,260 | 6/1965 | Nebout | 156—401 X |
| 3,281,305 | 10/1966 | Nädler et al. | 156—401 |
| 3,418,192 | 12/1968 | Nädler | 156—401 |
| 3,479,238 | 11/1969 | Kehoe et al. | 156—401 X |
| 3,489,634 | 1/1970 | Pizzo | 156—398 |

RALPH S. KENDALL, Primary Examiner

U.S. Cl. X.R.

156—398, 132